United States Patent
Wang et al.

(10) Patent No.: US 11,836,896 B2
(45) Date of Patent: Dec. 5, 2023

(54) SEMANTIC SEGMENTATION METHOD FOR AIRCRAFT POINT CLOUD BASED ON VOXELIZATION AND THREE VIEWS

(71) Applicant: Nanjing University of Aeronautics and Astronautics, Nanjing (CN)

(72) Inventors: Jun Wang, Nanjing (CN); Kun Xiao, Nanjing (CN); Zikuan Li, Nanjing (CN); Tianchi Zhong, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 18/320,280

(22) Filed: May 19, 2023

(65) Prior Publication Data

US 2023/0325978 A1    Oct. 12, 2023

(30) Foreign Application Priority Data

May 23, 2022 (CN) .......................... 202210559427.X

(51) Int. Cl.
*G06T 3/60* (2006.01)
*G06T 3/40* (2006.01)

(52) U.S. Cl.
CPC .............. *G06T 3/60* (2013.01); *G06T 3/4038* (2013.01)

(58) Field of Classification Search
CPC ................................ G06T 3/60; G06T 3/4038
See application file for complete search history.

(56) References Cited

U.S. PATENT DOCUMENTS

2016/0058288 A1* 3/2016 DeBernardis ........ A61B 5/0075
600/477

FOREIGN PATENT DOCUMENTS

| CN | 111080627 A |   | 4/2020  |
|----|-------------|---|---------|
| CN | 111860520 A | * | 10/2020 |
| CN | 111860520 A |   | 10/2020 |
| CN | 111862101 A |   | 10/2020 |
| CN | 113128405 A |   | 7/2021  |

OTHER PUBLICATIONS

Tao Wang et al., "Research of Deep Learning-Based Semantic Segmentation for 3D Point Cloud", Computer Engineering and Applications, 2021, vol. 57, No. 23, pp. 18-26.

* cited by examiner

*Primary Examiner* — Casey L Kretzer

(57) ABSTRACT

A semantic segmentation method for aircraft point cloud based on voxelization and three views, including: filtering a collected point cloud followed by centralization to obtain a centralized point cloud; inputting the centralized point cloud into a T-Net rotation matrix network; rotating the centralized point cloud to a front side followed by voxelization to obtain a voxelized point cloud; subjecting the voxelized point cloud to voxel filling to obtain a voxel-filled point cloud; calculating thickness maps of three views of the voxel-filled point cloud, followed by sequentially stitching and inputting to the point cloud semantic segmentation network to train the point cloud semantic segmentation network; inputting the collected point cloud into the trained point cloud semantic segmentation network; and predicting a result semantic segmentation of a 3D point cloud of the aircraft.

8 Claims, 6 Drawing Sheets

SEMANTIC SEGMENTATION METHOD FOR AIRCRAFT POINT CLOUD BASED ON VOXELIZATION AND THREE VIEWS

CROSS-REFERENCE TO RELATED APPLICATIONS

This application claims the benefit of priority from Chinese Patent Application No. 202210559427.X, filed on May 23, 2022. The content of the aforementioned application, including any intervening amendments thereto, is incorporated herein by reference in its entirety.

TECHNICAL FIELD

This application relates to semantic segmentation of aircraft point cloud, and more particularly to a semantic segmentation method for aircraft point cloud based on voxelization and three views.

BACKGROUND

In the reverse engineering, a point data collection of product surface obtained by measuring instruments is called point cloud. Generally, the number of points obtained by a 3D coordinate measuring machine is relatively small, and these points have a relatively large distance, which are named as sparse point clouds. By comparison, the point cloud obtained by a 3D laser scanner or a photographic scanner has a relatively large number of points and is relatively dense, and thus is named as dense point cloud. The point cloud data is acquired mainly by laser scanning, and multi-view reconstruction based on depth camera, binocular camera, or optical camera.

Point cloud segmentation refers to the division of points into multiple subsets according to their semantic meaning. For the 3D point cloud segmentation, it is required to know the global geometry and fine-grained details of each point. According to the segmentation granularity, the 3D point cloud segmentation strategies can be divided into semantic segmentation (scene level), instance segmentation (object level) and partial segmentation (part level). The existing deep learning-based segmentation methods of aircraft point clouds are mainly divided into voxel-based and image-based methods. In the voxel-based segmentation method, features are extracted from voxels in the form of 3D convolution after the point cloud voxelization, which has a slow computing process and requires a massive number of computational resources. For the image-based segmentation method, the point cloud is generally projected onto different views, and features are extracted from view images. The direct projection of 3D features to 2D images leads to the loss of a large number of features, reducing the accuracy.

SUMMARY

In view of the defects of the prior art, the present disclosure provides a semantic segmentation method for aircraft point cloud based on voxelization and three views, in which the training of a point cloud semantic segmentation network is accelerated by using point cloud voxelization and a thickness map under three views, so as to improve the accuracy of the point cloud semantic segmentation.

Technical solutions of the disclosure are described as follows.

This application provides a semantic segmentation method for aircraft point cloud based on voxelization and three views, comprising:

(S1) collecting, by a 3D scanner, a plurality of point clouds of an aircraft; assigning a label to each point in the plurality of point clouds; and filtering each of the plurality of point clouds followed by centralization to obtain a centralized point cloud;

(S2) inputting the centralized point cloud into a 3×3 T-Net rotation matrix network until a rotation loss function converges; and rotating the centralized point cloud to a front side;

(S3) adjusting a voxelization resolution of the centralized point cloud according to an adaptive scale to obtain a point cloud having the same voxel size; and subjecting the point cloud having the same voxel size to voxelization to obtain a voxelized point cloud;

(S4) subjecting an unoccupied voxel in the voxelized point cloud to voxel filling to obtain a voxel-filled point cloud;

(S5) respectively calculating a thickness map of three views of the voxel-filled point cloud;

(S6) building a point cloud semantic segmentation network; sequentially stitching thickness maps of the three views of the voxel-filled point cloud; inputting a stitched thickness map to the point cloud semantic segmentation network to train the point cloud semantic segmentation network until a cross-entropy loss function converges; and (S7) inputting the plurality of point clouds into the point cloud semantic segmentation network; and predicting a 3D point cloud semantic segmentation result of the aircraft.

In some embodiments, the step (S1) comprises:

(S101) collecting, by the 3D scanner, the plurality of point clouds of the aircraft; assigning a label to each point in the plurality of point clouds; filtering each of the plurality of point clouds according to a filter radius r; and filtering out a point with a point distance less than the filter radius r from each of the plurality of point clouds; and (S102) calculating a coordinate (X, Y, Z) of a center point of the plurality of point clouds after filtering; and subjecting all points in the plurality of point clouds to centralization by taking the center point as an original point to obtain the centralized point cloud.

In some embodiments, the coordinate (X, Y, Z) of the center point is calculated as follows:

$$X = \Sigma_{p_i \in P} x_{pi}/n;$$

$$Y = \Sigma_{p_i \in P} y_{pi}/n; \text{ and}$$

$$Z = \Sigma_{p_i \in P} z_{pi}/n;$$

wherein n is the number of points in the plurality of point clouds after filtering; i is an index of a point in the plurality of point clouds after filtering; $p_i$ represents an $i^{th}$ point in the plurality of point clouds after filtering; P represents the plurality of point clouds after filtering; $x_{pi}$ is a horizontal coordinate of the $p_i$; $y_{pi}$ is a vertical coordinate of the $p_i$; and $z_{pi}$ is a z-direction coordinate of the $p_i$.

In some embodiments, the rotation loss function $\mathcal{L}_{reg}$ is expressed as:

$$\mathcal{L}_{reg} = \|I - AA^T\|_F^2;$$

wherein I represents a unit matrix; A is a predicted rotation matrix; $A^T$ is a transposed matrix of the A; and $\| \|_F^2$ represents Frobenius norm (F-norm).

In some embodiments, the step (S3) comprises:
(S301) selecting a maximum horizontal coordinate, a minimum horizontal coordinate, a maximum vertical coordinate, a minimum vertical coordinate, a maximum z-direction coordinate and a minimum z-direction coordinate in the centralized point cloud rotated to the front side; calculating a difference Δx between the maximum horizontal coordinate and the minimum horizontal coordinate; calculating a difference Δy between the maximum vertical coordinate and the minimum vertical coordinate; and calculating a difference Δz between the maximum z-direction coordinate and the minimum z-direction coordinate;

(S302) setting a voxel size of each of the plurality of point clouds as d×d×d such that a horizontal coordinate resolution of each of the plurality of point clouds is $\alpha_x = \Delta x/d$, a vertical coordinate resolution of each of the plurality of point clouds is $\alpha_y = \Delta y/d$, and a z-direction coordinate resolution of each of the plurality of point clouds is $\alpha_z = \Delta z/d$;

(S303) performing steps (S301)-(S302) for each centralized point cloud rotated to the front side to obtain the point cloud having the same voxel size; and (S304) subjecting points in the point cloud having the same voxel size to voxelization to obtain the voxelized point cloud, wherein a coordinate of a voxel is $$(x_{t_i}, y_{t_i}, z_{t_i}); x_{t_i} = \left\lfloor \frac{x'_{p_i}}{\alpha_x} \right\rfloor; y_{t_i} = \left\lfloor \frac{y'_{p_i}}{\alpha_y} \right\rfloor; z_{t_i} = \left\lfloor \frac{z'_{p_i}}{\alpha_y} \right\rfloor;$$

expressed as $(x_{t_i}, y_{t_i}, z_{t_i})$; a voxel coordinate is indicates an operation of rounding down; $x'_{p_i}$ is a horizontal coordinate of an $i^{th}$ point in the point cloud having the same voxel size; $y'_{p_i}$ is a vertical coordinate of the $i^{th}$ point in the point cloud having the same voxel size; and $z'_{p_i}$ is a z-direction coordinate of the $i^{th}$ point in the point cloud having the same voxel size.

In some embodiments, the step (S4) comprises:
if the unoccupied voxel in the voxelized point cloud has at least one occupied voxel in each normal direction of a cubic surface of the unoccupied voxel, labeling the unoccupied voxel as occupied; and obtaining a voxel-filled point cloud.

In some embodiments, the step (S5) comprises:
(S501) for a front view of the voxel-filled point cloud, calculating the number of occupied voxels in z-direction for each voxel position on an xy-plane; and taking the number of occupied voxels in the z-direction as a thickness map of the front view;

(S502) for a left side view of the voxel-filled point cloud, calculating the number of occupied voxels in x-direction for each voxel position on a yz-plane; and taking the number of occupied voxels in the x-direction as a thickness map of the left side view; and (S503) for a top view of the voxel-filled point cloud, calculating the number of occupied voxels in y-direction for each voxel position on an xz-plane; and taking the number of occupied voxels in the y-direction as a thickness map of the top view.

In some embodiments, the point cloud semantic segmentation network comprises a first convolutional neural network (CNN), a second CNN, a third CNN, a fusion network, a first fully connected layer, a max-pooling layer, a second fully connected layer and a softmax layer; and the step (S6) comprises:
(S601) connecting the first CNN, the second CNN and the third CNN to the fusion network; connecting the fusion network to the first fully connected layer and the max-pooling layer; stitching the max-pooling layer with an output of the fusion network; and connecting the max-pooling layer successively to the second fully connected layer and the softmax layer;

(S602) for each voxel of the voxel-filled point cloud, inputting a thickness map of a front view into the first CNN to extract a feature vector of an xy-plane; inputting a thickness map of a left side view into the second CNN to extract a feature vector of a yz-plane; inputting a thickness map of a top view into the third CNN to extract a feature vector of an xz-plane; and inputting the feature vector of the xy-plane, the feature vector of the yz-plane and the feature vector of the xz-plane into the fusion network for concatenation to obtain a first concatenated vector;

(S603) inputting the first concatenated vector successively into the first fully connected layer and the max-pooling layer to extract a global feature vector; concatenating the global feature vector with the first concatenated vector to obtain a second concatenated vector; inputting the second concatenated vector successively into the second fully connected layer and the softmax layer; and predicting a category of each voxel after division; and (S604) performing steps (S602)-(S603) for each voxel-filled point cloud until the cross-entropy loss function converges to complete the training of the point cloud semantic segmentation network.

In some embodiments, the cross-entropy loss function $\mathcal{L}_{cls}$ is expressed as:

$$\mathcal{L}_{cls} = -\sum_{i=1}^{N} y_i \log y'_i;$$

wherein i is an index of a point in the plurality of point clouds after filtering; $y_i$ is a category of a label of an $i^{th}$ point; and $y_i'$ is a predicted category of the $i^{th}$ point.

Compared to the prior art, this application has the following beneficial effects.

In view of the large source consumption in the voxel-based deep learning process and the poor accuracy in the image-based multi-view deep learning point cloud segmentation, a semantic segmentation method for aircraft point cloud based on voxelization and three views is provided herein. Based on the fused thickness map, the method provided herein makes full use of the point cloud voxelization and multi-view thickness information of point clouds to accelerate the training process and improve the accuracy.

BRIEF DESCRIPTION OF THE DRAWINGS

FIG. 3a is a thickness map of a left side view; FIG. 3b is a thickness map of a front view; and FIG. 3c is a thickness map of a top view.

DETAILED DESCRIPTION OF EMBODIMENTS

The present disclosure will be described below in detail with reference to the accompanying drawings and embodiments.

Figure 1:
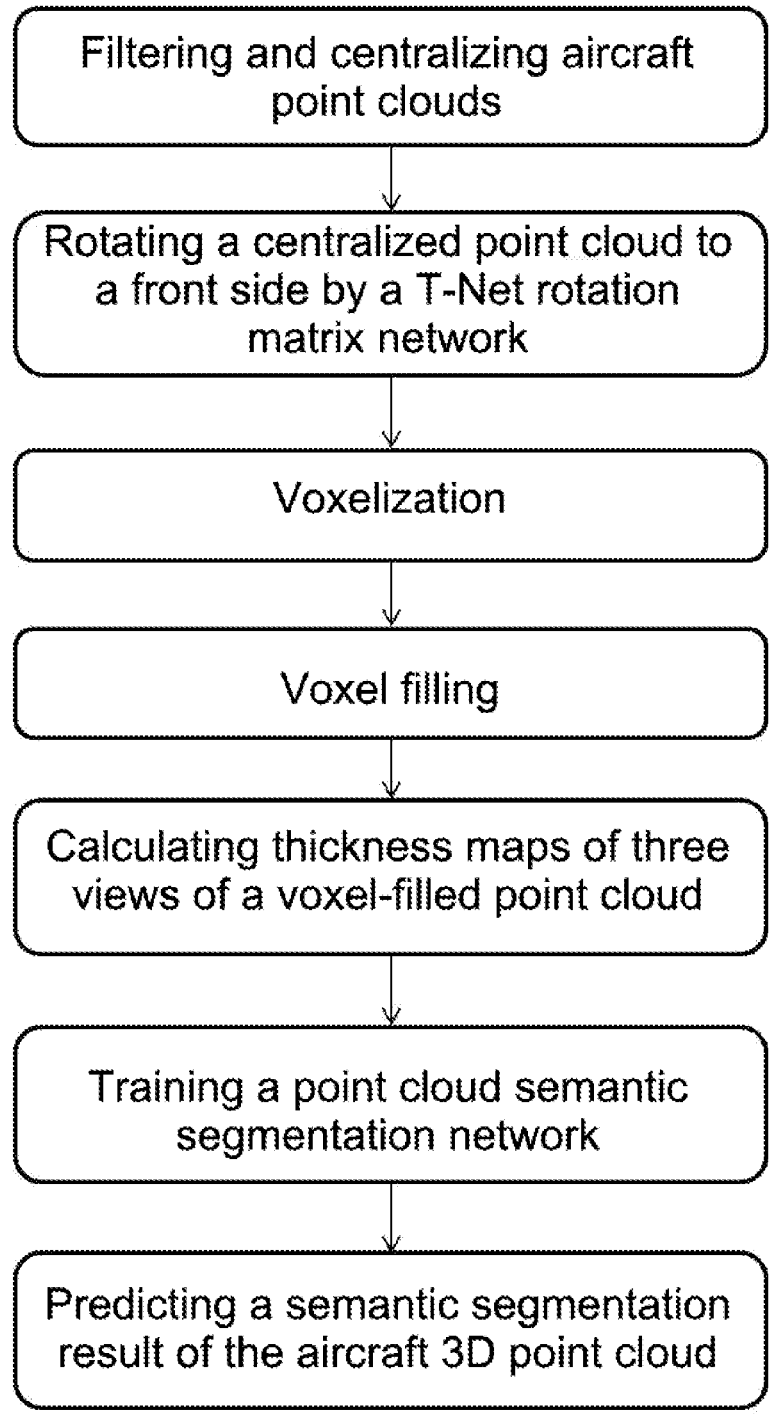
FIG. 1 is a flow chart of a semantic segmentation method for aircraft point cloud based on voxelization and three views according to an embodiment of the present disclosure.

As shown in FIG. 1, a method semantic segmentation for aircraft point cloud based on voxelization and three views is performed through the following steps.

(S1) Multiple point clouds of the aircraft are collected by a 3D scanner. A label is assigned to each point in the point clouds. Each of the point clouds is filtered followed by centralization to obtain a centralized point cloud. The step (S1) includes the following steps.

(S101) Multiple point clouds of the aircraft are collected by the 3D scanner. A label is assigned to each point in the point clouds. Each of the point clouds is filtered according to a filter radius r. A point with a point distance less than the filter radius r is filtered out from each of the point clouds. In consequence, a noise point is effectively filtered out from the point clouds of the aircraft, preventing a subsequent detection from interference of the noise point.

(S102) A coordinate (X, Y, Z) of a center point of the multiple point clouds after filtering is calculated. Points in the point clouds are subjected to centralization by taking the center point as an original point to obtain the centralized point cloud. Due to the centralization and the center point as the original point, a subsequent semantic segmentation network has the same central position input to adapt a training of a point cloud semantic segmentation network. Otherwise, the training of the point cloud semantic segmentation network is difficult to converge.

The coordinate (X, Y, Z) of the center point is calculated as follows:

$X = \Sigma_{p_i \in P} x_{pi}/n;$ $Y = \Sigma_{p_i \in P} y_{pi}/n;$ and $Z = \Sigma_{p_i \in P} z_{pi}/n;$ where n is the number of points in the plurality of point clouds after filtering; i is an index of a point in the plurality of point clouds after filtering; $p_i$ represents an $i^{th}$ point in the plurality of point clouds after filtering; P represents the plurality of point clouds after filtering; $x_{pi}$ is a horizontal coordinate of the $p_i$; $y_{pi}$ is a vertical coordinate of the $p_i$; and $z_{pi}$ is a z-direction coordinate of the $p_i$.

(S2) The centralized point cloud is input into a 3×3 T-Net rotation matrix network until a rotation loss function converges. The centralized point cloud is rotated to a front side. The centralized point cloud has a rotational invariance, that is, point cloud semantic segmentation results should be the same when one centralized point cloud is subjected to arbitrary rotations. In order to ensure the same output result after inputting the centralized point cloud with different rotation directions into the point cloud semantic segmentation network, a rotation matrix is trained by a T-Net network to ensure that the centralized point cloud before input into the point cloud semantic segmentation network has the same direction. The rotation loss function $\mathcal{L}_{reg}$ is expressed as follows:

$\mathcal{L}_{reg} = \|I - AA^T\|_F^2;$ where I represents a unit matrix; A is a predicted rotation matrix; $A^T$ is a transposed matrix of the A; and $\| \ \|_F^2$ represents Frobenius norm (F-norm).

(S3) A voxelization resolution of the centralized point cloud is adjusted according to an adaptive scale to obtain a point cloud having the same voxel size. The point cloud having the same voxel size is subjected to voxelization to obtain a voxelized point cloud. Due to the voxelization, the disordered and sparse point cloud becomes regular and conducive, facilitating feature extraction. The step (S3) includes the following steps.

(S301) A maximum horizontal coordinate, a minimum horizontal coordinate, a maximum vertical coordinate, a minimum vertical coordinate, a maximum z-direction coordinate and a minimum z-direction coordinate in the centralized point cloud rotated to the front side are selected. A difference Δx between the maximum horizontal coordinate and the minimum horizontal coordinate is calculated. A difference Δy between the maximum vertical coordinate and the minimum vertical coordinate is calculated. A difference Δz between the maximum z-direction coordinate and the minimum z-direction coordinate is calculated.

(S302) A voxel size of each of the point clouds is set as d×d×d such that a horizontal coordinate resolution of each of the plurality of point clouds is $\alpha_x = \Delta x/d$, a vertical coordinate resolution of each of the plurality of point clouds is $\alpha_y = \Delta y/d$, and a z-direction coordinate resolution of each of the plurality of point clouds is $\alpha_z = \Delta z/d$. Considering a restrictive nature of the point cloud semantic segmentation network, an input format of the point cloud semantic segmentation network should be the same every time. Thus, an input of the point clouds is controlled to have the same voxel size, so as to adapt an input of the point cloud semantic segmentation network.

(S303) Steps (S301)-(S302) are performed for each centralized point cloud rotated to the front side to obtain the point cloud having the same voxel size.

Figure 2:
FIG. 2 shows a voxelization result of the aircraft point cloud according to an embodiment of the disclosure.

(S304) Points in the point cloud having the same voxel size is subjected to voxelization to obtain the voxelized point cloud, where a coordinate of a voxel is expressed as ($x_{ti}$, $y_{ti}$, $z_{ti}$), a result is shown in FIG. 2; the voxel is labeled as occupied;

$$x_{t_i} = \left\lfloor \frac{x'_{p_i}}{\alpha_x} \right\rfloor; \ y_{t_i} = \left\lfloor \frac{y'_{p_i}}{\alpha_y} \right\rfloor; \ z_{t_i} = \left\lfloor \frac{z'_{p_i}}{\alpha_y} \right\rfloor;$$

⌊ ⌋ indicates an operation of rounding down; $x'_{pi}$ is a horizontal coordinate of an $i^{th}$ point in the point cloud having the same voxel size; $y'_{pi}$ is a vertical coordinate of the $i^{th}$ point in the point cloud having the same voxel size; and $z'_{pi}$ is a z-direction coordinate of the $i^{th}$ point in the point cloud having the same voxel size.

(S4) An unoccupied voxel in the voxelized point cloud is subjected to voxel filling to obtain a voxel-filled point cloud. Since the point clouds of the aircraft collected by the 3D scanner only has points of a surface of the aircraft, an interior of the point clouds has no points. In order to make a thickness map to better characterize length, width and height information of the aircraft at different locations, an unoccupied voxel in the interior of the point clouds is subjected to voxel filling to obtain a correct thickness map of the aircraft. Specifically, since the unoccupied voxel inside the point cloud is surrounded by other voxels, if the unoccupied voxel in the voxelized point cloud has at least one occupied voxel in each normal direction of a cubic surface of the unoccupied voxel, the unoccupied voxel is labeled as occupied. A voxel-filled point cloud is obtained.

(S5) Thickness maps of three views of the voxel-filled point cloud are respectively calculated. The point clouds are subjected to segmentation according to different thickness maps characterizing the length, width and height information of the aircraft at different locations. The step (S5) includes the following steps.

Figure 3A:
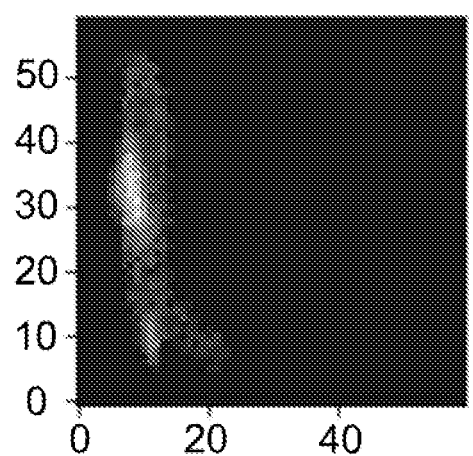
FIGS. 3a-3c are thickness maps of three views of a voxel-filled point cloud according to an embodiment of the present disclosure, where
Figure 3B:
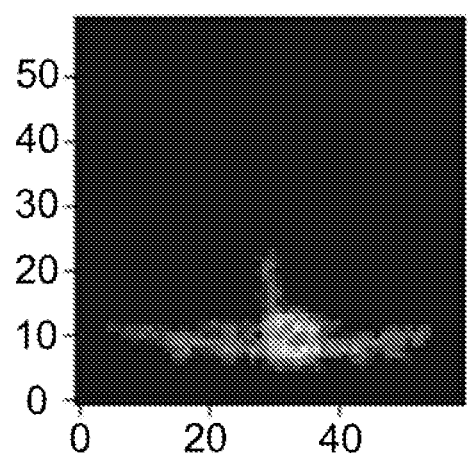

(S501) For a front view of the voxel-filled point cloud, the number of occupied voxels in z-direction for each voxel position on an xy-plane is calculated. The number of occupied voxels in the z-direction is taken as a thickness map of the front view, a result is shown in FIG. 3b.

(S502) For a left side view of the voxel-filled point cloud, the number of the occupied voxels in x-direction for each voxel position on a yz-plane is calculated. The number of occupied voxels in the x-direction is taken as a thickness map of the left side view, a result is shown in FIG. 3a.

Figure 3C:
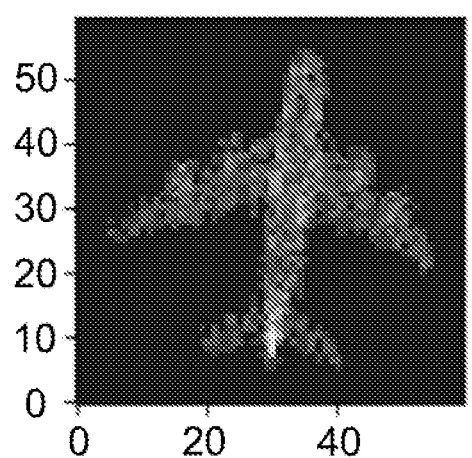

(S503) For a top view of the voxel-filled point cloud, the number of occupied voxels in y-direction for each voxel position on an xz-plane is calculated. The number of occupied voxels in the y-direction is taken as a thickness map of the top view, a result is shown in FIG. 3c.

(S6) A point cloud semantic segmentation network is built. Thickness maps of the three views of the voxel-filled point cloud are sequentially stitched. A stitched thickness map is input to the point cloud semantic segmentation network to train the point cloud semantic segmentation network until a cross-entropy loss function converges.

Figure 4:
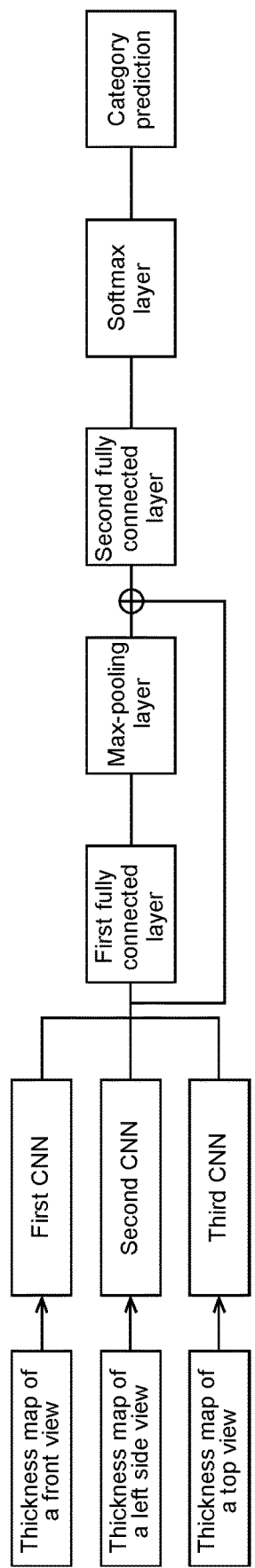
FIG. 4 schematically depicts a point cloud semantic segmentation network according to an embodiment of the present disclosure.

As shown in FIG. 4, the point cloud semantic segmentation network includes a first convolutional neural network (CNN), a second CNN, a third CNN, a fusion network, a first fully connected layer, a max-pooling layer, a second fully connected layer and a softmax layer.

The step (S6) includes the following steps.

(S601) The first CNN, the second CNN and the third CNN are connected to the fusion network, where the first CNN, the second CNN and the third CNN are configured to expand a feature vector dimension of each voxel at a corresponding position. The fusion network is connected to the first fully connected layer and the max-pooling layer, which is configured to extract a global feature vector. The max-pooling layer is stitched with an output of the fusion network. The max-pooling layer successively is connected to the second fully connected layer and the softmax layer.

(S602) For each voxel of the voxel-filled point cloud, the thickness map of the front view is input into the first CNN to extract feature vector of the xy-plane. The thickness map of the left side view is input into the second CNN to extract a feature vector of the yz-plane. The thickness map of the top view is input into the third CNN to extract a feature vector of the xz-plane. The feature vector of the xy-plane, the feature vector of the yz-plane and the feature vector of the xz-plane are input into the fusion network for concatenation to obtain a first concatenated vector.

(S603) The first concatenated vector is successively input into the first fully connected layer and the max-pooling layer to extract a global feature vector. The global feature vector is concatenate with the first concatenated vector to obtain a second concatenated vector. The second concatenated vector is successively input into the second fully connected layer and the softmax layer. A category of each voxel after division is predicted.

(S604) Steps (S602)-(S603) are performed for each voxel-filled point cloud until the cross-entropy loss function converges to complete the training of the point cloud semantic segmentation network.

Through the above processes, the point cloud semantic segmentation network can integrate length, width and height information of different parts in different views of the voxelized point cloud. Due to the CNN, the training for extracting information of different thickness maps is fast and accurate.

The cross-entropy loss function $\mathcal{L}_{cls}$ is expressed as follows:

$$\mathcal{L}_{cls} = -\sum_{i=1}^{N} y_i \log y_i';$$

where i is an index of a point in the plurality of point clouds after filtering; $y_i$ is a category of a label of an $i^{th}$ point; and $y_i'$ is a predicted category of the $i^{th}$ point.

(S7) The point clouds to be detected of the aircraft are input into the point cloud semantic segmentation network. A 3D point cloud semantic segmentation result of the aircraft is predicted.

In accordance with relevant experiments, the semantic segmentation method provided herein has an average prediction accuracy of 0.85, whereas the existing point cloud semantic segmentation network for aircraft fails to achieve. For example, the 3D CNN has an average prediction accuracy of 0.73, the PointNet has an average prediction accuracy of 0.74, and the PointNet++ has an average prediction accuracy of 0.83. Since the point cloud semantic segmentation network can integrate the length, width and height information of different parts in different views of the voxelized point clouds, features of different parts are effectively distinguished, thus leading to high prediction accuracy.

Mentioned above are merely preferred embodiments of this disclosure, which are not intended to limit the scope of the present disclosure. It should be understood that any improvements and modifications by those killed in the art without departing from the spirit of this disclosure should fall within the scope of the present disclosure defined by the appended claims.

What is claimed is:

1. A semantic segmentation method for creating an aircraft point cloud based on voxelization and three views, comprising:

(S1) collecting, by a three-dimensional (3D) scanner, a plurality of point clouds of an aircraft; assigning a label to each point in the plurality of point clouds; and filtering each of the plurality of point clouds followed by centralization to obtain a centralized point cloud;

(S2) inputting the centralized point cloud into a 3×3 T-Net rotation matrix network until a rotation loss function converges; and rotating the centralized point cloud to a front side;

(S3) adjusting a voxelization resolution of the centralized point cloud according to an adaptive scale to obtain a point cloud having a same voxel size; and subjecting the point cloud having the same voxel size to voxelization to obtain a voxelized point cloud;

(S4) subjecting an unoccupied voxel in the voxelized point cloud to voxel filling to obtain a voxel-filled point cloud;

(S5) respectively calculating a thickness map of three views of the voxel-filled point cloud;

(S6) building a point cloud semantic segmentation network; sequentially stitching thickness maps of the three views of the voxel-filled point cloud; and inputting a stitched thickness map to the point cloud semantic segmentation network to train the point cloud semantic segmentation network until a cross-entropy loss function converges; and (S7) inputting the plurality of point clouds into the point cloud semantic segmentation network; and predicting a 3D point cloud semantic segmentation result of the aircraft;

wherein the step (S5) comprises:

(S501) for a front view of the voxel-filled point cloud, calculating a number of occupied voxels in a z-direction for each voxel position on an xy-plane; and taking the number of occupied voxels in the z-direction as a thickness map of the front view;

(S502) for a left side view of the voxel-filled point cloud, calculating a number of occupied voxels in an x-direction for each voxel position on a yz-plane; and taking the number of occupied voxels in the x-direction as a thickness map of the left side view; and (S503) for a top view of the voxel-filled point cloud, calculating a number of occupied voxels in a y-direction for each voxel position on an xz-plane; and taking the number of occupied voxels in the y-direction as a thickness map of the top view.

2. The semantic segmentation method of claim 1, wherein the step (S1) comprises:

(S101) collecting, by the 3D scanner, the plurality of point clouds of the aircraft; assigning a label to each point in the plurality of point clouds; filtering each of the plurality of point clouds according to a filter radius r; and filtering out a point with a point distance less than the filter radius r from each of the plurality of point clouds; and (S102) calculating a coordinate (X, Y, Z) of a center point of the plurality of point clouds after filtering; and subjecting all points in the plurality of point clouds to centralization by taking the center point as an original point to obtain the centralized point cloud.

3. The semantic segmentation method of claim 2, wherein the coordinate (X, Y, Z) of the center point is calculated as follows:

$$X = \Sigma_{pi \in P} x_{pi}/n;$$

$$Y = \Sigma_{pi \in P} y_{pi}/n; \text{ and}$$

$$Z = \Sigma_{pi \in P} z_{pi}/n;$$

wherein n is the number of points in the plurality of point clouds after filtering; i is an index of a point in the plurality of point clouds after filtering; $p_i$ represents an $i^{th}$ point in the plurality of point clouds after filtering; P represents the plurality of point clouds after filtering; $x_{pi}$ is a horizontal coordinate of the $p_i$; $y_{pi}$ is a vertical coordinate of the $p_i$; and $z_{pi}$ is a z-direction coordinate of the $p_i$.

4. The semantic segmentation method of claim 1, wherein the rotation loss function $\mathcal{L}_{reg}$ is expressed as:

$$\mathcal{L}_{reg} = \|I - AA^T\|_F^2;$$

wherein I represents a unit matrix; A is a predicted rotation matrix; $A^T$ is a transposed matrix of the A; and $\|\ \|_F^2$ represents Frobenius norm (F-norm).

5. The semantic segmentation method of claim 1, wherein the step (S3) comprises:

(S301) selecting a maximum horizontal coordinate, a minimum horizontal coordinate, a maximum vertical coordinate, a minimum vertical coordinate, a maximum z-direction coordinate and a minimum z-direction coordinate in the centralized point cloud rotated to the front side; calculating a difference $\Delta x$ between the maximum horizontal coordinate and the minimum horizontal coordinate; calculating a difference $\Delta y$ between the maximum vertical coordinate and the minimum vertical coordinate; and calculating a difference $\Delta z$ between the maximum z-direction coordinate and the minimum z-direction coordinate;

(S302) setting a voxel size of each of the plurality of point clouds as d×d×d such that a horizontal coordinate resolution of each of the plurality of point clouds is $\alpha_x = \Delta x/d$, a vertical coordinate resolution of each of the plurality of point clouds is $\alpha_y = \Delta y/d$, and a z-direction coordinate resolution of each of the plurality of point clouds is $\alpha_z = \Delta z/d$;

(S303) performing steps (S301)-(S302) for each centralized point cloud rotated to the front side to obtain the point cloud having the same voxel size; and (S304) subjecting points in the point cloud having the same voxel size to voxelization to obtain the voxelized point cloud, wherein a coordinate of a voxel is $$x_{t_i} = \left\lfloor \frac{x'_{p_i}}{\alpha_x} \right\rfloor; \ y_{t_i} = \left\lfloor \frac{y'_{p_i}}{\alpha_y} \right\rfloor; \ z_{t_i} = \left\lfloor \frac{z'_{p_i}}{\alpha_y} \right\rfloor;$$

expressed as $(x_{ti}, y_{ti}, z_{ti})$; the voxel is labeled as occupied; $\lfloor\ \rfloor$ indicates an operation of rounding down; $x'_{pi}$ is a horizontal coordinate of an $i^{th}$ point in the point cloud having the same voxel size; $y'_{pi}$ is a vertical coordinate of the $i^{th}$ point in the point cloud having the same voxel size; and $z'_{pi}$ is a z-direction coordinate of the $i^{th}$ point in the point cloud having the same voxel size.

6. The semantic segmentation method of claim 1, wherein the step (S4) comprises:

if the unoccupied voxel in the voxelized point cloud has at least one occupied voxel in each normal direction of a cubic surface of the unoccupied voxel, labeling the unoccupied voxel as occupied; and obtaining the voxel-filled point cloud.

7. The semantic segmentation method of claim 1, wherein the point cloud semantic segmentation network comprises a first convolutional neural network (CNN), a second CNN, a third CNN, a fusion network, a first fully connected layer, a max-pooling layer, a second fully connected layer and a softmax layer; and the step (S6) comprises:

(S601) connecting the first CNN, the second CNN and the third CNN to the fusion network; connecting the fusion network to the first fully connected layer and the max-pooling layer; stitching the max-pooling layer with an output of the fusion network; and connecting the max-pooling layer successively to the second fully connected layer and the softmax layer;

(S602) for each voxel of the voxel-filled point cloud, inputting the thickness map of a front view into the first CNN to extract a feature vector of an xy-plane; inputting the thickness map of a left side view into the second CNN to extract a feature vector of a yz-plane; inputting the thickness map of a top view into the third CNN to extract a feature vector of an xz-plane; and inputting the feature vector of the xy-plane, the feature vector of the yz-plane and the feature vector of the xz-plane into the fusion network for concatenation to obtain a first concatenated vector;

(S603) inputting the first concatenated vector successively into the first fully connected layer and the max-pooling layer to extract a global feature vector; concatenating the global feature vector with the first concatenated vector to obtain a second concatenated vector; inputting the second concatenated vector successively into the second fully connected layer and the softmax layer; and predicting a category of each voxel after division; and (S604) performing steps (S602)-(S603) for each voxel-filled point cloud until the cross-entropy loss function converges to complete the training of the point cloud semantic segmentation network.

8. The semantic segmentation method of claim 7, wherein the cross-entropy loss function $\mathcal{L}_{cls}$ is expressed as:

$$\mathcal{L}_{cls} = -\sum_{i=1}^{N} y_i \log y_i';$$

wherein i is an index of a point in the plurality of point clouds after filtering; $y_i$ is a category of a label of an $i^{th}$ point; and $y_i'$ is a predicted category of the $i^{th}$ point.

* * * * *